(12) United States Patent
Fujiwara et al.

(10) Patent No.: US 10,798,960 B2
(45) Date of Patent: Oct. 13, 2020

(54) PROCESSED CITRUS FRUIT ITEM HAVING REDUCED BITTERNESS

(71) Applicant: SUNTORY HOLDINGS LIMITED, Osaka (JP)

(72) Inventors: Masaru Fujiwara, Kanagawa (JP); Yoshiaki Yokoo, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 147 days.

(21) Appl. No.: 15/558,048

(22) PCT Filed: Mar. 15, 2016

(86) PCT No.: PCT/JP2016/058185
§ 371 (c)(1),
(2) Date: Sep. 13, 2017

(87) PCT Pub. No.: WO2016/148152
PCT Pub. Date: Sep. 22, 2016

(65) Prior Publication Data
US 2018/0064151 A1 Mar. 8, 2018

(30) Foreign Application Priority Data
Mar. 16, 2015 (ES) .................. 201530337

(51) Int. Cl.
*A23L 27/12* (2016.01)
*A23L 2/06* (2006.01)
(Continued)

(52) U.S. Cl.
CPC .................. *A23L 27/13* (2016.08); *A23L 2/06* (2013.01); *A23L 5/20* (2016.08); *A23L 5/23* (2016.08);
(Continued)

(58) Field of Classification Search
CPC ..... A23V 2002/00; A23L 33/105; A23L 2/02; A23L 2/06; A23L 27/13; A23L 27/12;
(Continued)

(56) References Cited

U.S. PATENT DOCUMENTS

| 2,275,659 A | * | 3/1942 | Steinle | ..................... A23B 7/16 106/205.4 |
| 2,551,156 A | * | 5/1951 | Polk, Sr. | .................. A23N 4/18 426/482 |

(Continued)

FOREIGN PATENT DOCUMENTS

| EP | 1342778 A1 | 9/2003 |
| JP | 2000-350571 A | 12/2000 |

(Continued)

OTHER PUBLICATIONS https://en.oxforddictionaries.com/definition/fruit, retrieved online Jun. 5, 2019 (Year: 2019).*
(Continued)

*Primary Examiner* — Hong T Yoo
(74) *Attorney, Agent, or Firm* — Greenblum & Bernstein, P.L.C.

(57) ABSTRACT

Provided is a processed citrus fruit item in which the super surface layer of the peel of a citrus fruit is removed at a thickness at which the oil sacs in the peel are not destroyed, whereby the processed citrus fruit item has reduced bitterness while containing a wealth of flavor components.

8 Claims, 3 Drawing Sheets

(51) Int. Cl.
  *A23L 5/20* (2016.01)
  *A23L 21/10* (2016.01)
  *A23L 19/00* (2016.01)
  *A23N 7/08* (2006.01)

(52) U.S. Cl.
  CPC .............. *A23L 19/03* (2016.08); *A23L 21/10* (2016.08); *A23N 7/08* (2013.01)

(58) Field of Classification Search
  CPC . A23L 19/00; A23L 19/03; A23L 2/54; A23L 5/20; A23L 7/08
  See application file for complete search history.

(56) References Cited

U.S. PATENT DOCUMENTS

| | | | |
|---|---|---|---|
| 2,708,627 A | | 5/1955 | Toulmin, Jr. |
| 4,301,719 A | | 11/1981 | Gerow |
| 5,178,057 A | * | 1/1993 | Nahir .................... A23N 1/003 99/516 |
| 2006/0105089 A1 | | 5/2006 | Chu et al. |

FOREIGN PATENT DOCUMENTS

| | | |
|---|---|---|
| JP | 2013-201910 A | 10/2013 |
| RU | 2209017 C1 | 7/2003 |

OTHER PUBLICATIONS

Liu et al., "Water-based extraction of pectin from flavedo and albedo of orange peels", Chemical Engineering Journal, 2006, 120(3):203-209.

Okubo, "Emulsified flavor formulation super emulsion naturade series", The Food Industry, 2013, 56:66-73.

Poiana et al., "Supercritical Carbon Dioxide (SC—CO2) Extraction of Grapefruit Flavedo", Flavour and Fragrance Journal, 1998, 13(2):125-130.

Ranganna et al., "Citrus Fruits—Varieties, Chemistry, Technology, and Quality Evaluation. Part II. Chemistry, Technology, and Quality Evaluation. A. Chemistry", CRC Critical Reviews in Food Science and Nutrition, 1983, 18(4):313-386.

Siddiqui et al., "Studies on Debitteringof Sweet Orange Juice", World Journal of Dairy & Food Sciences, 2013, 8(2):185-189.

Search Report issued for Spanish Application No. 2015/30337, dated Apr. 25, 2016.

International Search Report issued for PCT/JP2016/058185, dated Jun. 21, 2016.

Database WPI/2017, Week 200374, AN 2003-785929, XP-002783026, Abstract of RU Application No. 20020108563, Thomson Scientific, London, GB.

Extended European Search Report issued in EP Patent Application No. 16764982.1, dated Jul. 24, 2018.

* cited by examiner ically, the invention relates
PROCESSED CITRUS FRUIT ITEM HAVING REDUCED BITTERNESS

TECHNICAL FIELD

This invention relates to processed citrus fruits that are reduced in bitterness. More specifically, the invention relates to processed citrus fruits that are manufactured by removing the super surface layer of the peel of citrus fruits with care being taken to keep the oil sacs intact and which are reduced in irritating intense bitterness of the peel of citrus fruits.

BACKGROUND ART

It is known that citrus fruits have irritating intense bitterness in the vicinity of peel. When making marmalade which contains citrus peel as an ingredient or candied peel as used in confectionary, bitterness of the peel is removed, in general, by repeating a process of washing the peel in water, draining the water, and washing the peel again in new water. However, this process takes time and sometimes the bitterness may not adequately be removed.

Patent Document 1 discloses a method for treating citrus peel characterized by immersing the citrus peel in warm water in which rice bran or the juice of rice bran is mixed to remove bitterness. Patent Document 2 discloses that rotating drums having a plurality of cutting blades are used to shave the peel of citrus fruits, thereby to remove the essential oils and bitter components.

In the method disclosed in Patent Document 1, there is a possibility that a grain like scent from rice bran is given to the citrus peel, which might result in distortion of the aroma of the citrus peel. In addition, rice bran needs to be prepared. In the method disclosed in Patent Document 2, essential oil which is known to contain aroma components is removed, so it is considered that most of the aroma of citrus fruits is lost.

Substances such as limonin and naringin are known as bitter components of citrus fruits. The distribution of these bitter components in fruits such as grapefruit or Citrus maxima has been reported, and the content of bitter components is reported to be high in the peel and the part that is growing (the center part of the fruit) (Non-Patent Documents 1 and 2).

CITATION LIST

Patent Documents

Patent Document 1: JP H7-51004 A
Patent Document 2: JP 2011-172558 A

Non-Patent Documents

Non-Patent Document 1: J. Agric. Food Chem., Vol. 45, 2876-2883 1997
Non-Patent Document 2: Kasetsart J. (Nat. Sci.) 43: 28-36 (2009)

SUMMARY OF INVENTION

Technical Problem

This invention is directed to provide processed citrus fruits which maintain aroma components characteristic of citrus fruits while being reduced in the irritating intense bitterness derived from the peel.

Solution to Problem

As a result of extensive research, the present inventors found that the intense bitterness of citrus peel was high in the super surface layer (within 1 mm from the outer surface, in particular, within 0.7 mm) of the peel. By removing the super surface layer of the peel by slicing the peel thinly enough not to rupture oil sacs in the peel, the inventors has succeeded in removing the bitterness of the peel while maintaining the aroma components of citrus peel. The present invention provides, for example, a processed citrus fruit from which the super surface layer of the peel is removed in a thickness such that oil sacs are not ruptured. By squeezing the thus obtained processed fruit as a whole by a commonly employed whole fruit extraction technique, juice can be produced that is rich in aroma components and low in bitterness. Further, the present invention provides, for example, a processed citrus fruit from which the super surface layer of the peel is removed in a thickness such that oil sacs are not ruptured and from which the pulp and seeds are further removed, and the present invention provides a processed citrus peel from which most of the white portion of the peel (albedo) is removed. It is considered that the thus obtained processed products can be used as ingredients of confections and dishes. Further, by immersing these processed citrus fruits or processed citrus peels in a solvent such as water or ethanol, citrus fruit extracts with low bitterness can be prepared.

A processed product of the present invention can be produced by a simple method; time-required treatments such as water-wash or immersion are not needed, nor does it use ingredients other than fruits, e.g. rice bran. Further, the processed product of this invention retains aroma components contained in oil sacs in citrus peel (essential oil from peel) and presents an aroma closer to that of natural fruits, and at the same time, the product is reduced in the intense bitterness.

DESCRIPTION OF EMBODIMENTS

The term "intense bitterness" as used herein refers to a physical stimulus caused by shrinkage of the mucosa of tongue and represents excessive or unpleasant bitterness which differs from moderate bitterness acceptable as a chemical stimulus. In general, it is known that bitter substances in small amounts, not greater than their thresholds, provide foods and dishes with complex, rich flavors and tastes. It is also known that bitterness has a contrast effect with sweetness. However, the bitterness of the peel of citrus fruit is an irritating, excessive bitterness, which is often perceived as unpleasant. This invention may selectively reduce this "intense bitterness."

The types of citrus fruits used in this invention are not particularly limited and any of the genus Citrus, the genus Fortunella, and the genus Poncitrus may be used. In particular, fruits having relatively strong bitterness in the peel, such as Citrus limon, Citrus aurantifolia, Citrus sudachi, Citrus sphaerocarpa, Citrus depressa, Citrus junos, Citrus paradisi, Citrus hassaku, Citrus natsudaidai, Citrus tamurana, Citrus iyo, and Citrus maxima can preferably be used. Also, Citrus sinensis, Citrus reticulata, Citrus unshiu, and the like may be used in this invention.

Figure 1:
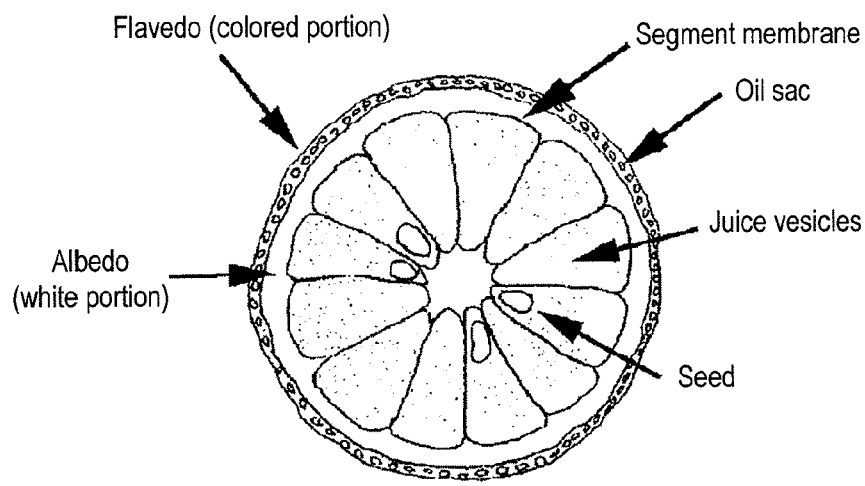
FIG. 1 is a cross section of a citrus fruit.

The citrus peel includes a dark colored flavedo portion and a white fibrous albedo portion. The flavedo contains a lot of oil sacs containing a large amount of essential oil having strong aroma (see FIG. 1 quoted from "Kajitsu no Jiten (Dictionary of Fruits)", published by Asakura Shoten, 2008, p. 198.) It has already been known that the peel of citrus fruit tastes bitter, but it is the present inventor who first found that the intense bitterness is localized, in particular, in the super surface layer of the peel. This invention relates to removing the super surface layer of the peel of citrus fruit and thereby reducing the bitterness characteristic of the peel. In this process, by removing the super surface layer with care being taken to ensure that the oil sacs in the peel (flavedo) are least destroyed, the bitterness may be solely reduced without loss of the aroma components contained in the oil sacs.

Figure 2:
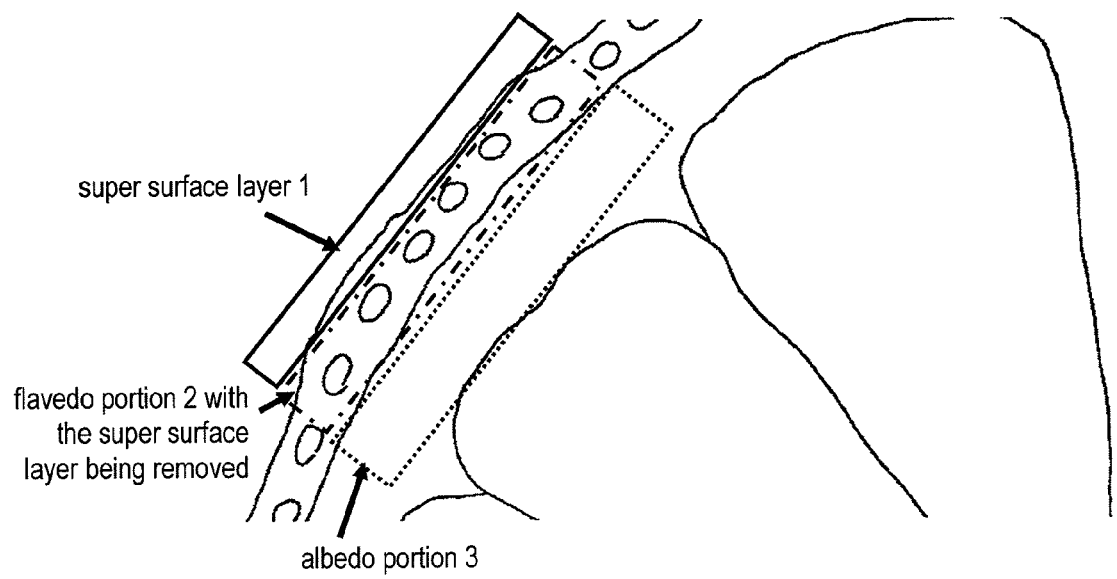
FIG. 2 shows an enlarged view of a part of FIG. 1. Super surface layer 1 is to be removed in the invention.

The super surface layer of peel to be removed according to the present invention is portion 1 shown in FIG. 2. Although varying with types and sizes of fruit, in general, the super surface layer has a thickness of within 1 mm from the outer surface of the peel, preferably within 0.9 mm, more preferably within 0.8 mm, yet more preferably within 0.7 mm, and is thin to a degree that most of the oil sacs remain without being ruptured. By removing the super surface layer in such a way that the oil sacs are kept intact as much as possible, aroma components in the oil sacs can be maintained while reducing the bitterness of peel. Further, although it is known that the aroma components contained in the essential oil in the oil sacs can be easily oxidized and deteriorated, such deterioration of the essential oil can be reduced by keeping the oil sacs intact as much as possible to prevent the essential oil from directly contacting the atmosphere (oxygen). When removing the super surface layer, it is preferable that more than 50% of the number of oil sacs remain without being ruptured, more preferably 70% or more, and yet more preferably 90% or more. The oil sacs can be observed either with an optical microscope or with the naked eye.

Figure 3:
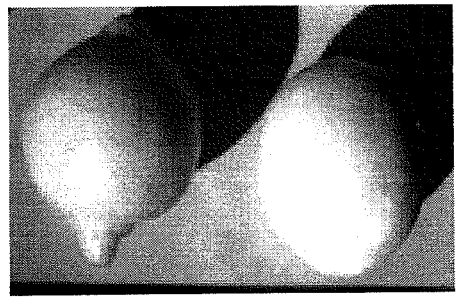
FIG. 3 shows photographs of the appearance of citrus fruits before and after removal of the super surface layer. In each photograph, the one on the left is before the removal and the one on the right is after the removal. The photograph on the top shows lemon, the second is lime, the third is white grapefruit, and the bottom is orange.
Figure 3:
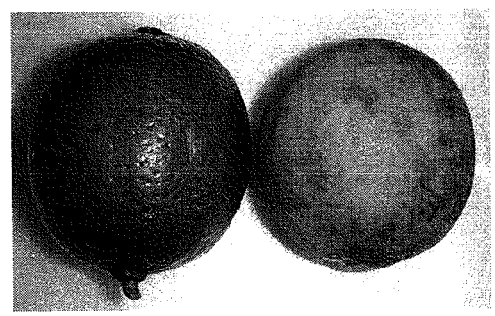
Figure 3:
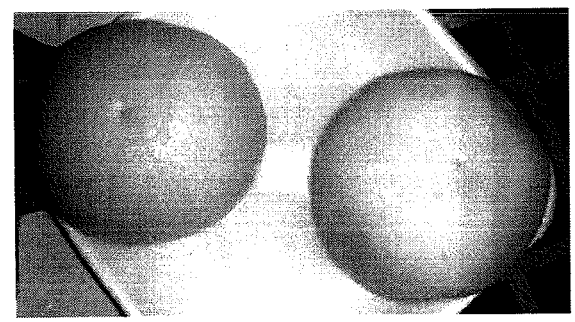
Figure 3:
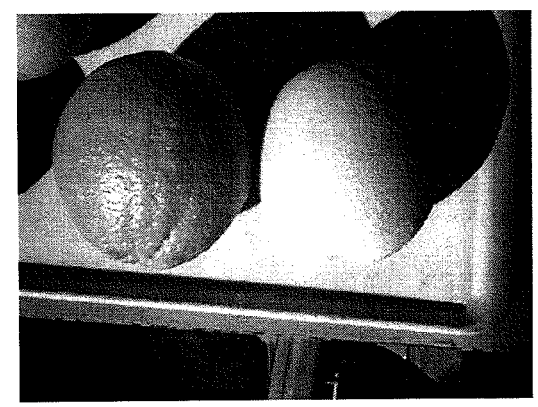

The super surface layer of peel is preferably removed in an area which accounts for 50% or more based on the total outer surface area of the peel, more preferably, 80% or more, yet more preferably 90% or more. It can also be observed with the naked eye whether the super surface layer was removed. If the super surface layer of peel has been removed, the color of the outer surface of the peel slightly changes. For example, in lemons and oranges, redness is slightly reduced and whiteness and yellowness are slightly increased, or the color becomes somewhat greenish (see FIG. 3).

In the process of removing the super surface layer of peel, use of tools such as knives or home peelers is not preferable because oil sacs might be ruptured. As a method for solely shaving the super surface layer without rupturing the oil sacs of the peel, it is preferable to use rotating drum peeling machines for root vegetables like potato. Such peeling machines are disclosed in JP Patent No. 4497427 specification, JP Patent No. 4247923 specification, JP Utility Model Registration No. 3084921 specification, and others. A rotating drum peeling machine has a pair of cylindrical rotating drums rotating outwards from each other at the top. In the present invention, it is preferable to use a peeling machine without having projections such as blades or nibs on its rotating drums. If a peeling machine having such projections on its rotating drums is used for peeling citrus fruits, oil sacs in the peel might be destroyed. As a rotating drum without such projections, for example, a drum having a perforated surface with many holes may preferably be used.

The thus obtained processed citrus fruit from which the super surface layer is removed can be used as the same as a regular citrus fruit. For example, by use of a whole fruit extractor, peel-containing juice (comminuted juice) can be produced from the processed citrus fruit to obtain a juice that retains aroma components and yet is reduced in bitterness.

In addition, by separating the pulp and seeds from the processed citrus fruit with a commonly employed technique, a processed product may be made that consists of peels (flavedo and albedo portions) and segment membrane. Further, a flavedo portion from which the super surface layer is removed may be obtained by removing most of the albedo and segment membranes. As to the structure of the area where the flavedo meets the albedo, the flavedo tissue and the albedo tissue are interwoven with each other and, thus, no clear border exists between them. Therefore, during the removal of albedo, a small amount of the albedo may remain attached to the flavedo. Also, a small amount of segment membrane that is connected with the albedo may remain attached to the albedo. In the case of removing albedo and segment membrane from the peel, it is preferable that 90% or more by weight of the albedo and segment membrane is removed. The thus obtained processed products of citrus fruit (in particular, the peel) can be used as confection ingredients such as candied lemon peel and candied orange peel as well as ingredients for making marmalade or dressing, to manufacture products that are rich in aroma and low in bitterness.

Also, the processed citrus fruits and the processed citrus peels of the present invention may be brought into contact with water or an organic solvent such as ethanol to produce citrus fruit extracts with low bitterness. In this process, the extract may be obtained by immersing the processed product in a solvent such as water or a hydrous alcohol for a long time, or also by crushing the processed product within a solvent such as water or a hydrous alcohol. The thus obtained extract can be used, for example, as an ingredient for imparting an aroma and flavor of citrus fruits to foods and drinks, namely, as an ingredient rich in aroma and low in bitterness.

EXAMPLES

On the following pages, several examples of the present invention are given but it should be understood that the present invention is by no means limited to these Examples.

Example 1

The peel of lemon was divided into three portions (1-3 shown in FIG. 2) and each was evaluated for intensity of bitterness and aroma by eating them directly and smelling them. The intensity was evaluated on a 5-point scale, from 1 indicating "weak" to 5 indicating "strong."

TABLE 1

|  | Portion | Intense bitterness (irritating properties) | Intensity of aroma |
|---|---|---|---|
| Sample 1 | Super surface layer (from the outer surface of the peel to the surface of oil sacs) | 4 | 1 |
| Sample 2 | Flavedo portion from which the super surface layer is removed | 2-3 | 3 |
| Sample 3 | Albedo portion | 1-2 | 1 |

The irritating bitterness was found to be localized, in particular, in the super surface layer of the peel. Further, it was suggested that the super surface layer was low in aroma and, thus, the bitterness could be reduced without loss of the aroma by removal of the surface layer.

Example 2

Figure 4:
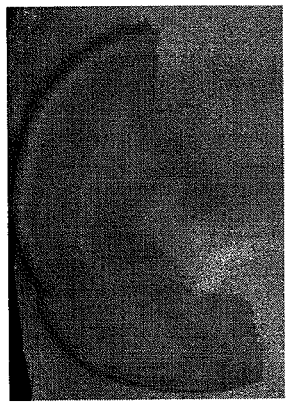
FIG. 4 shows a photograph of the processed peel that was produced in Example 2.

By use of a rotating drum peeler for root vegetables, the super surface layer of a whole lemon was removed in such a way that 90% or more of oil sacs were left. The obtained processed lemon was cut in halves and most of the pulp, seeds, and segment membranes were removed from the peel to obtain a processed peel (FIG. 4). The obtained product was emulsified under crushing in water and the solids content was centrifugally removed to create an emulsified liquid. The obtained emulsified liquid was incorporated according to the recipes shown in Table 2 and the sample was filled into a bottle; carbonated gas was pressed in the bottle; and then the sample was pasteurized by heating at 85° C. for 5 minutes to produce carbonated drink 1. As comparative examples, carbonated drinks 2 and 3 were created: carbonated drink 2 was prepared by the same method as used to produce carbonated drink 1, except that the super surface layer was not removed, and carbonated drink 3 was prepared by the same method as used to produce carbonated drink 1, except that not only the super surface layer but also the flavedo portion was removed. The intensity of bitterness and aroma of each drink was evaluated in the same manner as in Example 1.

TABLE 2

|  | Amount of incorporation (g/L) | | | Flavor evaluation | |
|---|---|---|---|---|---|
|  | Emulsified liquid | Granulated sugar | Citric acid anhydride | Intense bitterness (irritating properties) | Intensity of aroma |
| Carbonated drink 1 | 10.0 | 90.0 | 1.5 | 1 | 4 |
| Carbonated drink 2 (Comparative Example) | 7.4 | 90.0 | 1.5 | 5 | 5 |
| Carbonated drink 3 (Comparative Example) | 7.4 | 90.0 | 1.5 | 2 | 2 |

Carbonated drink 2 (Comparative Example) created by use of a regular lemon from which the super surface layer was not removed was rich in aroma but very strong in bitterness resulting from the combination with the stimulation by carbon dioxide. In contrast, carbonated drink 1 created by use of the processed lemon from which the super surface layer was removed was reduced in the bitterness and this drink was refreshing and easy to drink, yet having the stimulation by carbon dioxide and the aroma of lemon. With regard to Carbonated drink 3 (Comparative Example) from which the whole flavedo was removed, the bitterness was further reduced but a lot of the aroma was lost, which made the drink unsatisfactory as a lemon drink.

Further, lime, grapefruit, and orange fruits, in place of lemon, were subjected to super surface layer removal and used to produce carbonated drinks (°Brix 9.1, citric acid acidity 0.15%, gas volume 2.0 v/v). The drinks were compared to those produced without the removal of the super surface layer. The carbonated drinks produced by using the processed fruits from which the super surface layer is removed had reduced bitterness. The drinks were refreshing and easy to drink, and had stimulation by carbon dioxide and the aroma of the corresponding fruit. A further study was conducted by using non-carbonated drinks (°Brix 9.1, citric acid acidity 0.15%) and the evaluation showed that bitterness was clearly reduced in the processed products in which the super surface layer removal was carried out, compared to the case of carbonated drinks. The obtained non-carbonated drinks had an aroma of fruit and excellent drinkability.

Production Example 1

Production of Lemon Juice

By use of a rotating drum peeler for root vegetables, the super surface layer of a whole lemon was removed in such a way that 90% or more of oil sacs were left. The obtained processed lemon was cut in four pieces, and to the cut product, water and sugar were added to give °Brix 10. The mixture was crushed with a home mixer and then the resulting product was filtered with gauze to obtain lemon juice. The obtained lemon juice had a perceivable favorable lemon aroma, and although it had a strong sour taste, the irritating intense bitterness characteristic of lemon was reduced in it.

Production Example 2

Production of Candied Lemon Peel (Dried Fruit)

The processed lemon peel of Example 2 (FIG. 4) was cut into rectangles; 100 parts by weight of the processed lemon peel and 80 parts by weight of sugar were put in a pan; enough water was added to cover the processed lemon peel; and the mixture was simmered over low heat. The stove was turned off when a small amount of the juice was left and the resulting matter was taken out of the pan and dried for a period of time ranging from about half a day to about one day. The dried matter was coated with granulated sugar to obtain candied lemon peel. The obtained candied lemon peel was low in an unpleasant bitter taste and was easy to eat.

Production Example 3

Production of Marmalade of Citrus Natsudaidai

By use of a rotating drum peeler for root vegetables, the super surface layer of a whole Citrus natsudaidai was removed in such a way that 90% or more of oil sacs were left. The obtained processed Citrus natsudaidai of 100 parts by weight was divided into the peel and the pulp; the peel was cut into rectangles; and the pulp together with the segment membrane was cut into fractions. The pulp of Citrus natsudaidai was turned into puree by heating. To the puree, the peel (from which the super surface layer was removed) and 60-70 parts by weight of sugar were added and the mixture was simmered in the pan, while being stirred, until it reached a moderate consistency to obtain marmalade. The obtained marmalade had a fresh flavor just like that of Citrus natsudaidai and had a moderate, slightly bitter taste, but did not have a perceivable unpleasant bitterness.

The invention claimed is:

1. A processed citrus fruit comprising a peel, wherein:
   a part of a super surface layer of the peel has been shaved from an outer surface of the peel at 50% or more of an outer surface area of the peel, and
   50% or more by number of oil sacs present in the peel of the same fruit prior to processing remain in the peel of the processed citrus fruit and are not ruptured.

2. The processed citrus fruit according to claim 1, wherein a thickness of the shaved super surface layer of the peel is from 0.7 mm to 1.0 mm.

3. The processed citrus fruit according to claim 1, wherein 80% or more of the outer surface area of the peel has been shaved.

4. The processed citrus fruit according to claim 1, wherein 70% or more of the number of oil sacs are kept intact without being ruptured.

5. A processed citrus peel, obtained by removing the pulp and seeds from the processed citrus fruit according to claim 1.

6. The processed citrus peel according to claim 5, wherein 90% or more by weight of segment membrane and albedo have been removed.

7. A citrus fruit extract which is obtained by a method comprising bringing the processed citrus fruit according to claim 1 into contact with water or an organic solvent.

8. A method for producing a processed citrus fruit comprising shaving a part of a super surface layer of a peel of a citrus fruit from an outer surface of the peel at 50% or more of an outer surface area of the peel to produce the processed citrus fruit, wherein 50% or more by number of oil sacs present in the peel of the same fruit prior to processing remain in the peel of the processed citrus fruit and are not ruptured.

\* \* \* \* \*